(No Model.) 8 Sheets—Sheet 1.

T. L. KNIGHT & E. BECKLEY.
CHECK ISSUING AND RECORDING APPARATUS.

No. 486,344. Patented Nov. 15, 1892.

Witnesses:
John Revell
Albert Popkins

INVENTORS.
Thomas L. Knight
Edward Beckley
By their Attys. Howson and Howson

(No Model.) 8 Sheets—Sheet 3.

T. L. KNIGHT & E. BECKLEY.
CHECK ISSUING AND RECORDING APPARATUS.

No. 486,344. Patented Nov. 15, 1892.

Witnesses
George Baumann
James Graeur

INVENTORS.
Thomas Loonan Knight
Edward Beckley
By their Attys. Howson & Howson (No Model.) 8 Sheets—Sheet 4.
T. L. KNIGHT & E. BECKLEY.
CHECK ISSUING AND RECORDING APPARATUS.
No. 486,344. Patented Nov. 15, 1892.

FIG. 5.

Witnesses
George Bannann
John Revell

INVENTORS.
Thomas Loonan Knight & Edward Beckley.
By their attorneys
Howston and Howston (No Model.) 8 Sheets—Sheet 6.

T. L. KNIGHT & E. BECKLEY.
CHECK ISSUING AND RECORDING APPARATUS.

No. 486,344. Patented Nov. 15, 1892.

Witnesses
John Revell
Albert Popkins

INVENTORS.
Thomas L. Knight
Edward Beckley
By their Attys. Howson and Howson (No Model.) 8 Sheets—Sheet 7.

T. L. KNIGHT & E. BECKLEY.
CHECK ISSUING AND RECORDING APPARATUS.

No. 486,344. Patented Nov. 15, 1892.

Witnesses
John Revell
Albert Popkins

INVENTORS.
Thomas L. Knight
Edward Beckley
By their Attys. Howson and Howson (No Model.) 8 Sheets—Sheet 8.

T. L. KNIGHT & E. BECKLEY.
CHECK ISSUING AND RECORDING APPARATUS.

No. 486,344. Patented Nov. 15, 1892.

UNITED STATES PATENT OFFICE.

THOMAS LOONAN KNIGHT AND EDWARD BECKLEY, OF LONDON, ENGLAND.

CHECK ISSUING AND RECORDING APPARATUS.

SPECIFICATION forming part of Letters Patent No. 486,344, dated November 15, 1892.

Application filed February 6, 1891. Serial No. 380,538. (No model.) Patented in England February 19, 1889, No. 2,876.

*To all whom it may concern:*

Be it known that we, THOMAS LOONAN KNIGHT, wharf manager, of 8 Albert Square, Commercial Road, London, in the county of Middlesex, and EDWARD BECKLEY, brass-finisher, of 30 Atholl Street, Poplar, London, England, subjects of the Queen of Great Britain and Ireland, have invented certain Improvements in Check Issuing and Recording Apparatus, (for which we have obtained a patent in Great Britain, No. 2,876, dated February 19, 1889,) of which the following is a specification.

Our said invention relates to apparatus for checking, indicating, and recording the receipt of money and for issuing checks or coupons to purchasers, as is the custom, for example, in many large retail establishments and in co-operative stores and the like. The whole of the mechanism is inclosed in a box or case which can be placed upon or in juxtaposition to a counter or bar, and, if desired, in connection with the till or money receptacle. On one side of the apparatus and accessible to the salesman is a dial-plate and pointer, the said dial under a suitable arrangement having a circle of figures on its face representing dollars and cents and in some instances another circle or dial. The pointer has a handle by which the salesman can turn it to the value of the sale effected. Attached to the case is a second dial with circles of dollar and cent figures and corresponding pointers. This second dial is or may be under lock and key and constitute a record of all money received during the day. In conjunction with these dials there is a ticket stamping and recording arrangement on the top of the case, consisting of stamps or stamping-pads raised and lowered by handle for marking the amount of the purchase on the ticket and for marking the date and severing the coupons when it is desired that such should be handed to the customer. The raising of the handle after the stamping operation rotates feed-rollers, which feed a fresh portion of the paper to the stamps. Beneath each of the stamping-pads, which impress or print the amounts and dates on the paper, is situated a revolving wheel or ring, upon the periphery of which are cut or attached dies of progressive amounts. These amounts are exactly opposite to the corresponding amounts marked on the dial accessible to the shopman, so that when he turns his pointer to any sum on the dial these figures are presented beneath the pad, and the paper will be stamped with these figures when the stamping-pad is depressed. When the apparatus is in operation, the strip of paper having been placed in position when a purchase is made, the shopman revolves his pointer to the requisite extent on the dial. Instantaneously the same amount is registered on the lockfast-dial. The shopman then depresses his stamps and impresses or prints the figures representing the amount on the paper strip. He also depresses the date-stamp and at the same time severs the strip for presentation to the purchaser. While the pads are upon the dies the wheel is held in position; but when the pads are raised the released money-wheel with axis and pointer return to their position at zero ready for the next sale. A spring, which is partly coiled up by turning the pointer, brings the parts back to their normal position, where they are held by a stop. To prevent the too-rapid return of the parts, we place a vane or brake in connection with the spring-shaft. As the stamps are raised they pull on a connecting-rod fitted with a pawl, which acts upon a ratchel-wheel and by means of interposed gearing causes the feed-rollers to advance a fresh portion of paper beneath the stamps. The apparatus is capable of modification.

By employing an apparatus made in accordance with our invention shop-keepers and others are supplied with a reliable check upon their sales and money-takings and dishonesty in assistants is prevented.

To render our invention perfectly clear, we will now proceed to describe the same, with reference to the annexed sheets of drawings.

Fig. 3 is a view of the apparatus in elevation, the front of the case and the dial being removed. Fig. 7 is a view similar in character to Fig. 3, but from the opposite side of the machine, so as to show the permanent recording pointers and dials. The remaining Figs. 8 to 20, inclusive, are devoted to details and modifications of the apparatus and will be referred to in due course.

Referring to the said drawings, the apparatus is contained in an outer case A, to the front of which is secured the dial B, which, as shown, carries the amount of three dollars with the subdivision of five cents, although it will, of course, be evident that a larger amount than three dollars and a more minute subdivision of cents might equally well appear on the dial. In front of the dial is a pointer C, turned by a handle D and fixed to a central axis or spindle E. This spindle is carried in bearings in the frames F F', which support and contain the apparatus. The frames are united by the stays G. The central spindle E extends from the front dial B through to the pawl-carrier H, where it terminates in a center point, as shown in the detail view Fig. 15 and in dotted lines in Fig. 4, the said center point entering and supporting the inner end of a shorter spindle I, also shown in dotted lines and lying in line with the spindle E. The other end of the shorter spindle I is carried in a bearing in the back frame F².

We will now point out the several parts which are fixed and loose on the spindle E, as the operation of the mechanism will be more easily followed if these parts are clearly ascertained at this stage of the description. First of all we have the pointer C, which is fixed on the end of the spindle and in front of the dial B. Behind the dial and the front of the case A we next have the spur-wheel J, which is loose on the spindle. Close against the spur-wheel J is a ratchet-pinion J', which is fixed on the spindle, and on the side of the spur-wheel J is a ratchet-pawl and spring J², which engages with the ratchet pinion J' and connects the loose spur-wheel and fixed ratchet-pinion only when the spindle E is revolving backward—that is, in the direction of the arrow, Fig. 3. The function of the spur-wheel J is to rotate the vane J³ at a high speed, so as to constitute a retarding brake to prevent a too-quick return of the spindle and parts, as will be hereinafter described.

Midway between the frames F and F' the type-wheel K is fixed on the spindle, and also the end of a coiled spring L, by which the spindle-pointer and type-wheel are automatically brought back to zero. On the other side of the frame F' there is the ratchet-wheel M, fixed on the spindle, and a ratchet-pawl carrier H, also fixed on the extreme inner end of the spindle, as aforesaid.

Figure 1:
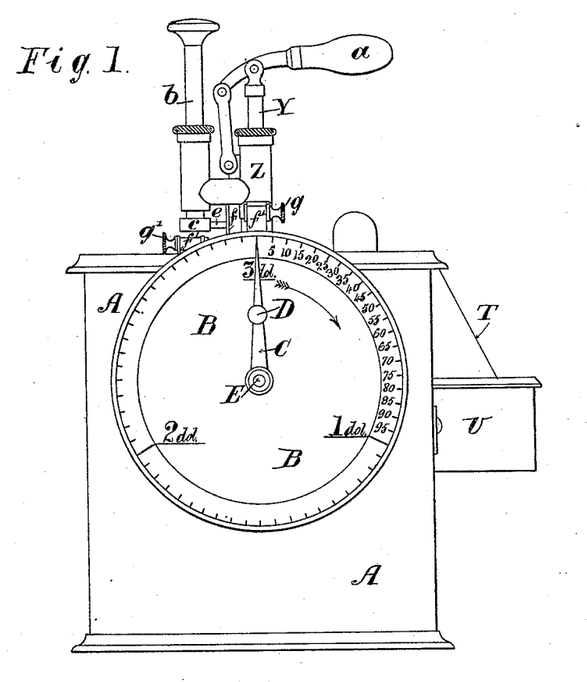
Figure 1 is a front elevation of the recording apparatus in its case.
Figure 2:
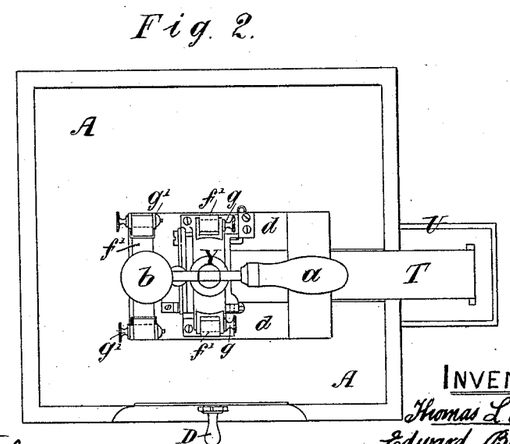
Fig. 2 is a plan of Fig. 1.
Figure 4:
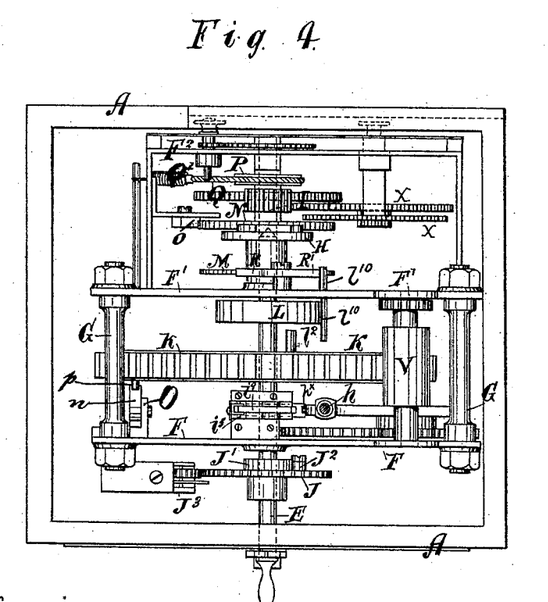
Fig. 4 is a plan of Fig. 3 with the top stamping-gear removed.
Figure 6:
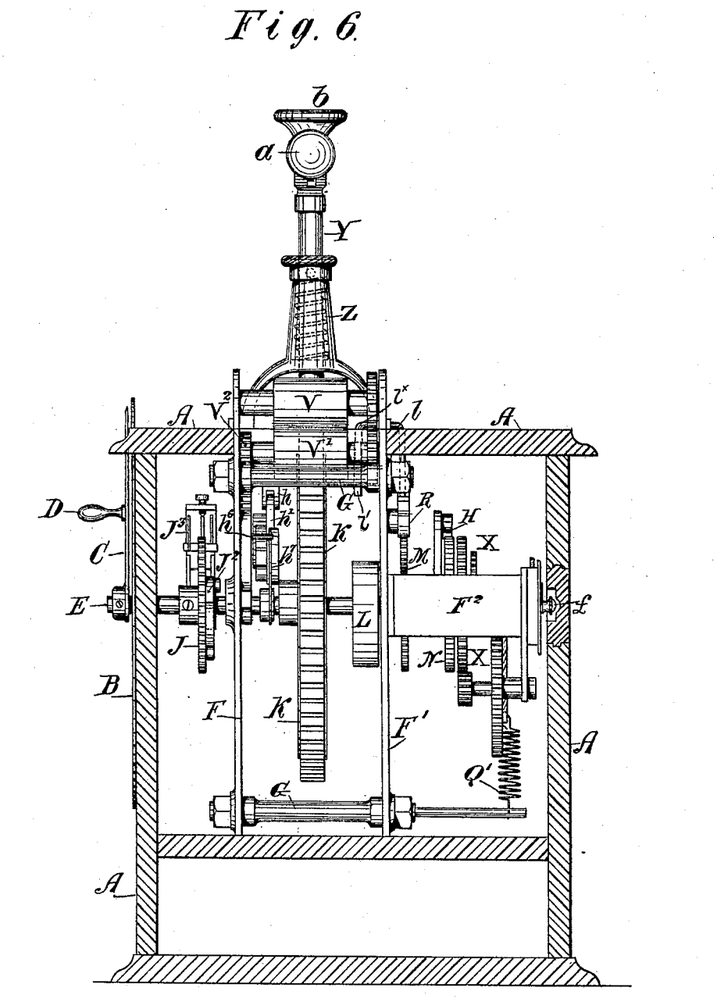
Fig. 6 is a sectional view at right angles to Fig. 5.
Figures 7, 8, 10:
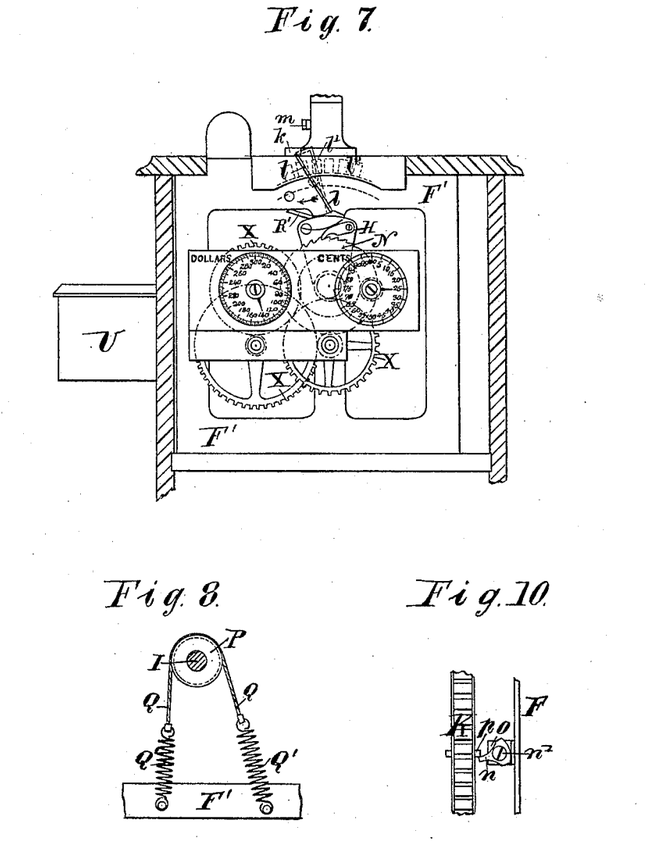
Figure 9:
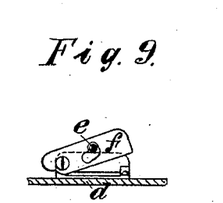

When the spindle E is turned toward the right hand—as, for example, when the front pointer is operated by the salesman in the direction of the arrow, Fig. 1—the pawl on the carrier H engages with the ratchet-wheel N on the shorter shaft I and causes it to turn with it, thus operating the train of gearing X, which turns the pointers on the dollars and cents dials, which appear in Figs. 4 and 7. The gearing X is so proportioned as to indicate five cents on the cents-dial for each five cents on the front dial B, and progressively on the dollars-dial up to three hundred dollars. A stop-pawl o, pivoted on the frame, prevents the return of the ratchet-wheel N, and a spring-brake consisting of a cord Q, passing partly around the pulley P and attached at each end to springs Q', as shown separately at Fig. 8, keeps the ratchet-wheel N against the stop-pawl o. This brake insures the registering of the index-fingers exactly opposite the marks on the dial. The friction between the cord Q and the pulley P causes one of the springs Q' to be slightly stretched during the rotation of the shaft, and when the rotation ceases the resiliency of the spring always draws the shaft and ratchet-wheel back fully against the stop o, instead of letting the stop rest half-way up the tooth. There is also a ratchet-pawl R pivoted on the frame and engaging with the ratchet-wheel M, (see Figs. 4, 6, and 16,) which pawl prevents the type-wheel and spindle from rotating backward, except when the pawl R has been raised to permit of this backward rotation. The type-wheel K carries on its periphery a succession of figures representing amounts progressing from five cents to three dollars. The stamping, paper-feeding, and cutting-off arrangements are situated at the top of the apparatus and are plainly shown in the drawings. The roll of paper T is carried in a box U, attached to the side of the casing A. The paper passes through a slit in the lid of the box and between boxes in feed-rollers V V', made of rubber or other suitable material and geared together so as to revolve simultaneously. The stamping-pad W comes opposite to the periphery of the type-wheel K and is carried on the lower end of a ram Y, which is held up in position shown in the drawings by means of a coiled spring inclosed in the sleeve Z, through which the ram passes. (See Fig. 6.) The stamping-pad W is brought down upon the paper T, over the type presented on the periphery of the type-wheel K, by means of a handle a, as clearly indicated in the drawings. Another ram b carries the pad c for stamping a date or name or other matter on the paper T or coupon, the date or other type being inserted in the sole-plate d. A coiled spring also upholds the ram b in the position shown in the drawings, the flat top of the ram affording facilities for depressing it. From the side of the pad-carrier c there projects a pin e, which engages with a slot in the pivoted knife f, which is separately shown at Fig 9, and also shown in Fig. 3, (these two views of the knife being at right angles to each other,) so that when the stamp c is brought down the slip of paper is at the same time severed, thus forming a coupon for presentation to the customer and bearing on its face the date and the amount of the sale or other information. Inking-ribbons $f'$ $f'$ are carried on rollers $g$ $g'$ and supply the money and date types, respectively, with ink. The rising of the ram Y causes the feed-rollers V V' to rotate to a sufficient extent to feed a fresh portion of the slip to the stamps. This is effected by connecting the part W by means of a link $h$ to a tumbler $h'$, centered on a stud $h^2$, which also carries a ratchet-wheel $h^3$ and an attached spur-wheel $h^4$, which latter gears with a pinion $V^2$ on the lower feed-roller V', Fig. 5. The tumbler $h'$ carries a spring-pawl $h^5$, which engages with the ratchet-wheel $h^3$, sliding over the teeth when the link $h$ is depressed and engaging with the teeth on the upstroke, so as to turn the wheels $h^3$ and $h^4$, and consequently rotate the feed-rollers V V', as described. A spring-pawl $h^6$, pivoted to the frame, has a tooth which engages with the spur-wheel $h^4$ and holds it immovably when the rollers V V' are not to be operated. The means whereby this pawl is lifted out of gear at the times when the wheel $h^4$ is to be allowed to rotate are as follows: On the end of the tumbler $h'$ we fix a cam-face $h^7$, which bears on a pin projecting from the pawl $h^6$, Figs. 5 and 6. It will be seen that when the tumbler is in the position shown in the drawings the pin occupies a depressed portion in the face of the cam $h^7$ to allow the pawl $h^6$ to engage the teeth of wheel $h^4$; but when the tumbler $h'$ is rotated by pushing down the link $h$, as described, the pin rides upon the higher portion of the cam-surface, and so by withdrawing the pawl-tooth from engagement with the spur-wheel $h^4$ leaves the said wheel at liberty to turn to the requisite extent. The feed-rollers V V' are consequently held and released at the proper time. We also provide means for preventing the ram Y and stamping-pad W from being depressed by the handle $a$ except at the times when, a sale having been effected, the salesman turns the pointer C round to the sum or amount of the sale on the dial B.

Figure 5:
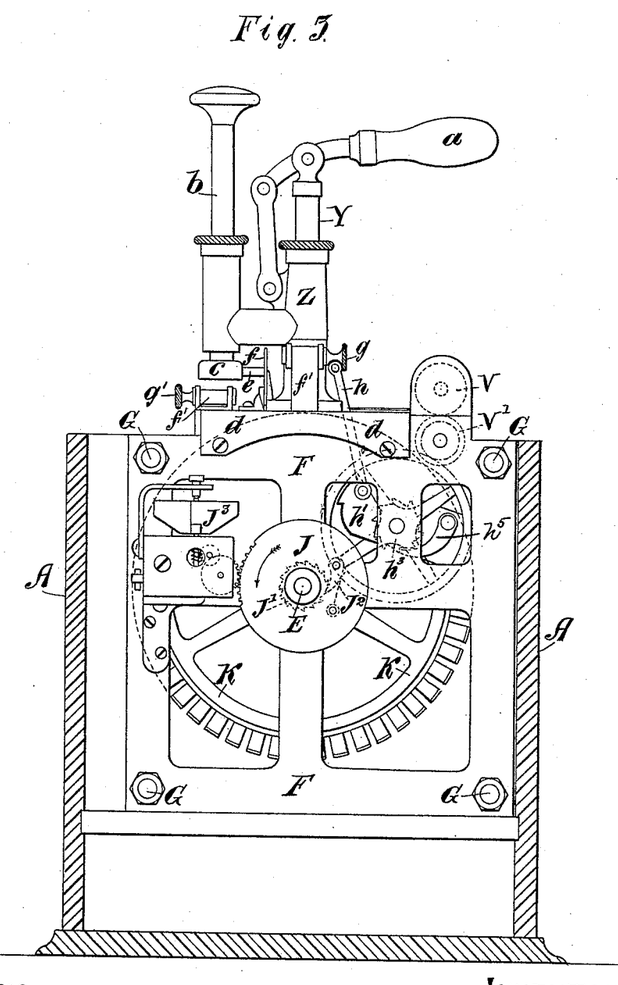
Fig. 5 is a sectional view similar to Fig. 3, but farther back, and with a portion of the front frame removed to show the parts more clearly.
Figures 14, 15, 16, 17, 19:
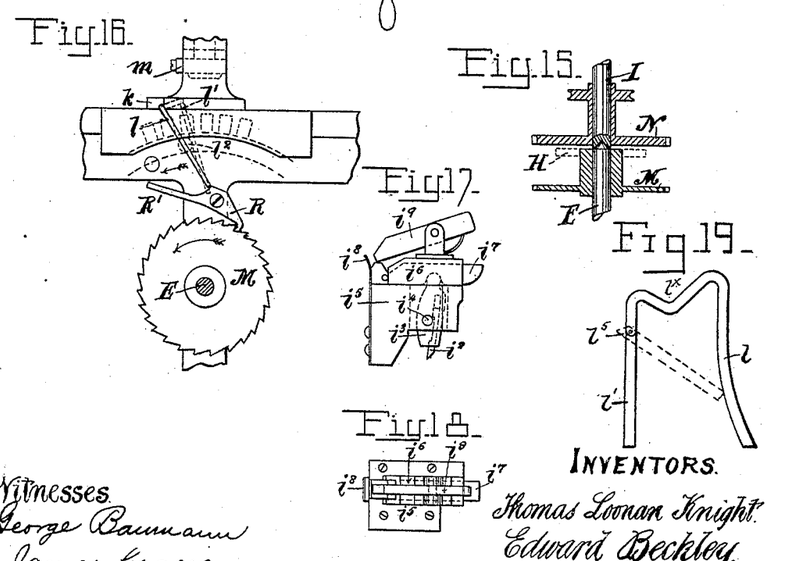
Figure 14:
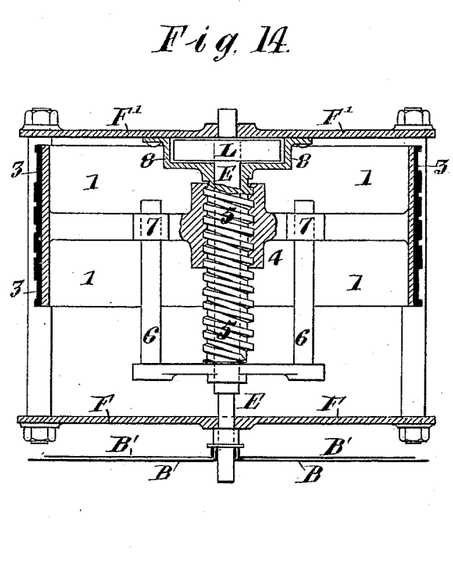
Figure 15:
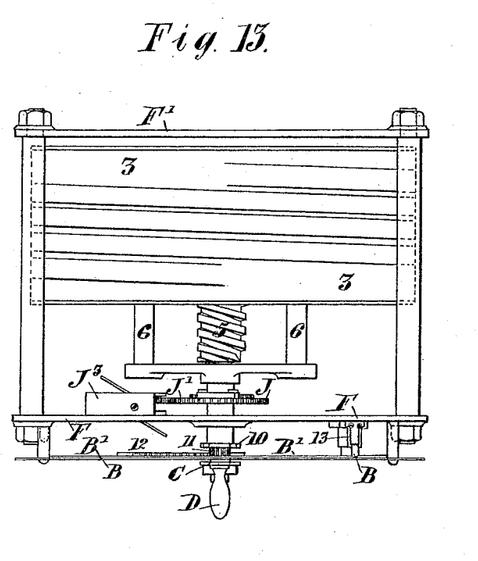

Referring to Figs. 5, 17, and 18, Figs. 17 and 18 showing, respectively, a side elevation and plan, a fixed collar $i$ on the spindle E carries a pin $i'$ with a sloping point, which when the pointer $c$ is at zero lies face to face with and against the straight side of another pin $i^2$, also with a sloping point, which pin $i^2$ slides loosely in a pivoted double lever $i^3$, the said double lever being pivoted at $i^4$ in a recess in the block $i^5$, which is attached to the side frame F. The block $i^5$ carries a box-recess $i^6$, in which slides a stop $i^7$, the said stop being held forward and in gear with a tooth $h^\times$ on the tumbler $h'$ by a back spring $i^8$. A spring-locking stop $i^9$ is pivoted on the top of the box $i^6$. When the spindle E is turned to record a sale, the pin $i'$ rocks the lever $i^3$ and pushes the stop $i^7$ in the direction of the arrow and against the pressure of the spring $i^8$. When pushed a certain distance, the locking-stop $i^9$ drops into the notch in the stop $i^7$ and holds it back. Now when the handle $a$ is pushed down the tumbler $h'$ is free from the stop $i^7$ and will act in the manner already described to operate the feed-rollers V V'. When the handle $a$, and consequently the link $h$, is depressed, the catch $h^8$ on the link $h$ comes in contact with the shorter end of the locking-stop $i^9$ and tilts it, so as to raise the end which holds the sliding stop $i^7$, the said sliding stop being thus allowed to return to its former position. When the link $h$ again rises, bringing back the tumbler $h'$, the tooth $h^\times$ on the tumbler coming against the curved under side of the sliding stop pushes it back, so as to allow the tooth $h^\times$ to pass and re-assume its former locking position above the sliding stop $i^7$. While this return of the parts is taking place the type-wheel K has been also released and is coming slowly back under the control of the vane $J^3$. Just as it approaches zero the sloping back of the pin $i'$ comes against the sloping back of the pin $i^2$ and pushes it up into the double lever $i^3$, so that the pin $i'$ passes into the position shown in the drawings, the pin $i^2$ dropping down in front of it again as soon as it is past. The means by which the type-wheel K is held and released are shown in Figs. 4, 6, and 7, but more particularly in the detail views Figs. 16 and 20, and are as follows: We have already referred to the type-wheel K being held wherever it is moved by means of the ratchet-wheel M and pawl R, and we have also explained that a coiled spring L tends constantly to return the type-wheel to zero. It is obvious then that all that is required to be provided is means for releasing the ratchet-wheel M from the pawl R. These are as follows: The pawl R has a tail R', which appears in Figs. 7 and 16. Above this tail and pivoted in a bearing $k$ is a staple-formed wire frame having two legs $l$ $l'$. This staple-lever is shown detached and in perspective by Fig. 19.

In Fig. 16 the leg $l$ appears in full lines and the leg $l'$ in dotted lines. The leg $l$ vibrates above the pawl R from the center at $k$. The knee $l^\times$ of the leg $l'$ lies at an incline above the level of the sole-plate $d'$, as seen in Figs. 6, 7, and 16. When a stamping-pad carrier W is brought down, by operating the handle $a$ a projection $m$, which is secured to the said pad-carrier W, strikes upon the said knee $l^\times$ and makes the leg $l$ swing or vibrate in the direction of the arrow, coming in contact with and thus depressing the tail R' of the pawl R, so that the ratchet-wheel M is liberated and the spindle E and type-wheel K return to zero. The leg $l'$ is jointed at $l^5$ just below the knee, so that when the type-wheel is being turned forward by the operator this jointed portion folds in the direction of rotation, so as to offer no resistance to a pin $l^2$, which projects from the side of the type-wheel, whereas on the return of the type-wheel this pin $l^2$, on coming again in contact with the jointed portion, finds the said jointed portion inflexible, and, pushing it before it, brings the leg $l$ back to the position shown in Figs. 7 and 16, allowing the ratchet-pawl R to drop again into gear with the ratchet-wheel M. A pin $l^{10}$ is passed through the frame F', as shown at Fig. 4, the outer ends of which prevent the legs of lever $l\ l'$ from moving too far away from their proper positions.

The type-wheel is held in its normal position at zero and is prevented from making more than one complete revolution by the pivoted stop $n$, which appears in the plan view Fig. 4, but is more clearly represented at Fig. 10. The stop $n$ is pivoted to a bracket O, which is attached to the framing. In the position shown at Fig. 10 the type-wheel K is being held by the tension of the coiled spring L against the stop $n$ in the fixed projection $p$, extending from the wheel. It will be evident that if the stop $n$ were fixed the wheel K could not make a complete revolution by the thickness of the stop $n$ and the projection $p$; but by making stop $n$ movable we practically shift the point of stopping-contact to one side or the other of the pivot $n'$, the distance so shifted being equivalent to the thickness of the point of the stop and of the projection. When the wheel K is completely rotated, the projection $p$ will approach the stop $n$ from beneath and lift the stop through the requisite distance before it becomes immovable by its top back corner abutting against the foot of the bracket.

Having thus clearly described the various parts of the mechanism with their actions and reactions, we will now briefly refer to its operation. The strip of paper T is led from the roll in the box U and is first passed between the feed-rollers V V', so that the end of the slip lies beneath the stamping-pad W. The current date is also inserted in type beneath the pad $c$. The machine is now ready for use. When a sale has been effected—say to the amount of one dollar and twenty-five cents—the pointer C is turned to this amount on the dial B, thus bringing the equivalent type on the wheel K beneath the pad W. I then depress the pad by means of a handle $a$, and thus stamp the amount on the end of the slip. The handle $a$ on being released is raised by the spring, and the link $h$ communicates motion on its upstroke to the hereinbefore-described gear which drives the feed-rollers, with the result that the slip of paper is advanced beneath the dating-stamp $c$. I then depress the said stamp $c$ and stamp the date, at the same time operating the pivoted knife $f$, so as to cut off the stamped and dated portion of the slip, and thus form a coupon for presentation to the customer. In the meantime the type-wheel K has returned to its normal position at zero, so as to be ready for a fresh transaction. Simultaneously with these operations the amount of one dollar and twenty-five cents is added to the sum already shown on the dollar and cent dials, which are boxed in under lock and key by the sliding lid $q$, so that we possess a continuous record of the day's sales, which cannot possibly be tampered with and can be consulted at any moment. When setting the machine again to zero, the pointer on the boxed-in dials can be turned by the milled nuts on the ends to the zero-figures without rotating the spindles and gear.

Figures 11, 12, 20:
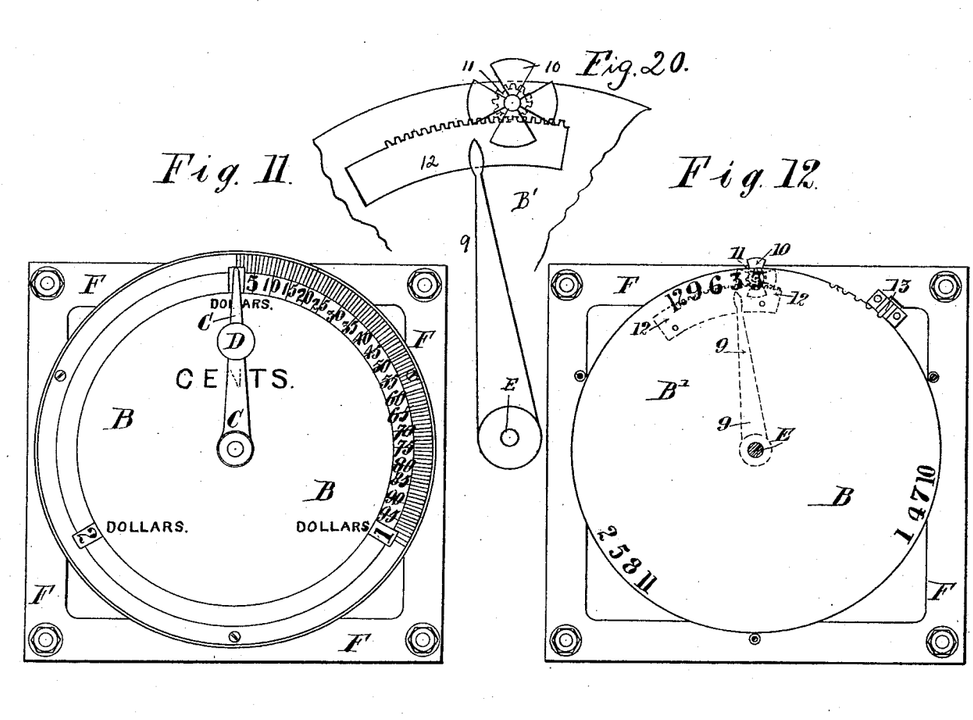

Figs. 11 to 14, inclusive, and Fig. 20 illustrate a modification of our invention, showing how a considerable sum can be represented on one type-wheel and with smaller subdivisions of money than appears on the type-wheel K in the former sheets. Fig. 11 is a face view of the fixed front dial and pointer. Fig. 12 is a view of the back loose dial. Fig. 13 is a plan; Fig. 14, a sectional plan; and Fig. 20 is a view of part of the disk B', showing the reversed side from that shown in Fig. 12. Only so much of the apparatus as is necessary to illustrate the modifications is shown, the outer case, the permanent recording-dials, the stamping arrangements, and other parts being omitted, these having been already fully described. To obtain room for this increase of subdivision and of total we require to increase the proportions of the type-wheel 1, both in its diameter and in the breadth of its periphery, and we also adopt means for shifting it longitudinally on its axis, so as to present progressively fresh numerals to the printing or stamping pads, which are not shown, but which we have already described. We also modify the front dial 2 in accordance with the requirements. In the present instance we find that the most convenient mode of applying the requisite numerals to the type-wheel 1 is to place upon the said wheel a stereotype-shell 3, bearing the numerals, say, from one cent to twelve dollars. These numerals are therefore formed upon the stereotype-shell and are arranged round the periphery in a spiral column in regular order—thus, one cent, two cents, three cents, four cents, five cents, and so on—one circuit of the shell representing three dollars. There are four such spiral circuits on the shell. Therefore the total amount represented on the shell is twelve dollars. Of course it will be evident that this amount could be increased, if desired. The wheel 1, which carries the shell 3 or any other similar shell which might be placed upon it, has a central boss 4, which comprises a nut engaging with a central triple screw 5, which is bolted to the back frame F' and is made hollow to permit of the passage of the central spindle E, which is supported in bearings in the frames F and F'. The spindle E has a pointer C and handle D, so that the pointer can be turned in front of the dial B, the outer edge of which dial is marked off into cents to the amount of three dollars in the circumference and in exact correspondence with the stereotype-numerals on the shell 3. Thus if the pointer is set to three cents on the dial the shell presents three cents to the stamp, and if the pointer is revolved two times and a half opposite to the dial then seven dollars and fifty cents will be presented on the shell to the pad, and so on. The wheel 1 is driven from the spindle E by means of a fork 6, which is fixed on the spindle E. The limbs of the fork 6 pass loosely through holes made to receive them in bosses 7 on two of the arms of the wheel 1. As the wheel 1 advances on the screw 5 it approaches the cross-piece of the fork, the driving-lines sliding through the bosses 7. The foot 8 of the screw 4, by which the screw is attached to the frame F', is made hollow and large enough to contain the coiled spring L, which returns the wheel 1 after each transaction to its starting-point. A vane $j^3$ is provided to act as a brake during the return motion and is driven from the ratchet and spur wheels J and J' on the spindle E, as in the former figures.

Behind the dial B, which is fixed to the front frame, is another dial B', which is mounted loosely on the central spindle E. This loose dial B' lies close against the back of the fixed dial B and is moved through a certain space at the conclusion of each revolution of the pointer C. The object of so moving it at each revolution of the pointer C is to provide fresh indications of the dollars for each revolution of the pointer. For example, during the first revolution of the pointer c the numerals 1 2 3, which are painted on the back dial B', show through three openings in the circumference of the fixed dial B. When the pointer has made a complete revolution round to the three-dollar aperture, the end of the arm 9, which is fixed on the spindle E, enters one of four recesses in a disk 10, which is carried on a stud from the frame F. On the axis of the disk 10 is fixed a pinion 11, which gears with a circular rack-segment 12, fixed to the back of the plate B'. At each engagement of the arm 9 the disk 10 is turned one-fourth of a revolution, and the loose disk B' is correspondingly turned sufficiently to carry the numerals exposed at the apertures in the dial B out of sight and bring fresh numerals opposite the apertures. For example, at the first movement of the disk 10, and consequently of the dial B', the first numeral "3" will be replaced by the second numeral "3." The other numerals "1" and "2" will be replaced by "4" and "5." At the next revolution the numeral "3" will be replaced by "6," while the numerals "4" and "5" will be replaced by "7" and "8." At the last revolution the respective numerals "9," "10," "11," and finally "12" will appear. A spring-catch 13 enters depressions in the periphery of the loose disk B', one of each of the said depressions corresponding to a numeral or number on the loose disk, so that when the said disk is shifted so as to change the figures appearing through the apertures in the fixed disk the catch 13 enters the corresponding depressions and holds the loose disk firmly until the next change. In operating with this modified apparatus, as the fixed disk B is divided into three dollars, each dollar being subdivided into cents, the starting-point of the pointer C is from the aperture through which the first numeral "3" on the back disk B' shows, this "3" representing the termination of the first round on the dial B, and consequently "0" when it constitutes the starting-point. The first aperture after the starting shows "1 dollar," the second "2 dollars," and the last on the circuit "3 dollars." Suppose the sale effected amounts to one dollar and twenty-five cents. The salesman turns the pointer round past the first aperture and halts at "25 cents" further on. The corresponding type "1 dollar 25 cents" will now have been brought beneath the stamping-pad. The stamping is effected, the coupon cut off, and the type-wheel returned to "0." Suppose, again, that the sale amounts to seven dollars and three cents. The pointer is revolved twice and after passing the aperture where "7 dollars" shows is halted at "3 cents." During the first circuit the aperture shows "1 dollar," "2 dollars," and "3 dollars;" during the second circuit "3 dollars," (at the top,) "4 dollars," and "five dollars," and during the third "6 dollars," "7 dollars," and "8 dollars;" and if the fourth were entered upon the aperture would show "9 dollars," "10 dollars," and "11 dollars." At the end of the last revolution the "12 dollars" would show at the top, this being the limit of the sum indicated on the type-wheel.

In the apparatus set forth in the foregoing part of this specification the recording arrangements, the nature of the coinage, and the subdivisions thereof could be altered to suit circumstances—for example, although the description has referred more particularly to United States money, it will easily be understood that the dials and type-wheels could be arranged, marked, and figured so as to correspond with coinage on the British or other systems. In our British specification, No. 2,876 of 1889, the apparatus is illustrated as arranged to indicate "£ s. d."

We claim as our invention—

1. In an apparatus for checking, indicating, and registering, the combination of feed-rollers to feed forward a strip of paper with a stamping-pad, a spur-wheel $h^4$, gearing with a pinion on one of the feed-rollers, a spur-wheel $h^3$, attached to the spur-wheel $h^4$, a tumbler provided with a cam-surface and with a pawl to engage the spur-wheel $h^3$, a link connecting the tumbler with the said stamping-pad, and a spring-stop to engage the spur-wheel $h^4$ and acted upon by the cam-surface on the tumbler, all substantially as and for the purposes set forth.

2. In an indicating, checking, and registering apparatus, the combination of indicating mechanism, a stamping-pad, and ram therefor with means for preventing the stamping-pad from being depressed, the said means consisting of a tumbler provided with a projecting tooth, a link connecting the stamping-pad with the tumbler, a spring-stop $i^7$ to engage the tooth on the tumbler, a rocking lever to disengage the spring-stop from the tooth, means for operating the rocking lever from the indicating mechanism, a spring-stop $i^9$ to engage the stop $i^7$, and a catch on the link to act upon the stop $i^9$, all substantially as and for the purposes set forth.

3. In an indicating, checking, and registering machine, the combination of checking mechanism, a type-wheel, and spindle E therefor with means for controlling the movement thereof, consisting of a ratchet attached to the spindle E, a pawl engaging the ratchet-wheel and provided with a tail-piece, a rocking double lever, one end of which is adapted to move over the said tail-piece to disengage the pawl from the ratchet-wheel, and means for rocking the said lever by the movement of the checking mechanism, all substantially as set forth.

4. In an indicating and checking machine, a pointer and two dials, one behind the other, the front dial being stationary and having marked thereon divisions and numerals in a progressive series and provided with openings, the back dial being movable and having marked thereon a series of figures adapted to show through the openings in the front dial, and means for moving the back dial at each revolution of the pointer, in combination with a type-wheel provided with a series of numerals representing progressive amounts arranged spirally around the circumference of the wheel and means for transmitting rotary and longitudinal motion to the type-wheel from the pointer, whereby the amount on the type-wheel corresponding to the amount indicated by the pointer and dials will be in position for printing the check.

In testimony whereof we have signed our names to this specification in the presence of two subscribing witnesses.

THOMAS LOONAN KNIGHT.
EDWARD BECKLEY.

Witnesses to the signature of Thomas Loonan Knight:
ROB BRADLEY,
20 *Bucklersbury, London, E. C.*
JAMES WILLIAM ELLERTON,
13 *Mehetabel Road, Clapton Park, N. E.*

Witnesses to the signature of Edward Beckley:
JOSHUA ENTWISLE,
RICHARD IBBERSON.